A. RAICH.
GEAR SHIFT INDICATOR.
APPLICATION FILED DEC. 1, 1921.

1,427,415.

Patented Aug. 29, 1922.
2 SHEETS—SHEET 1.

Inventor
A. Raich

By J. K. Bryant
Attorney

A. RAICH.
GEAR SHIFT INDICATOR.
APPLICATION FILED DEC. 1, 1921.
1,427,415.
Patented Aug. 29, 1922.
2 SHEETS—SHEET 2.
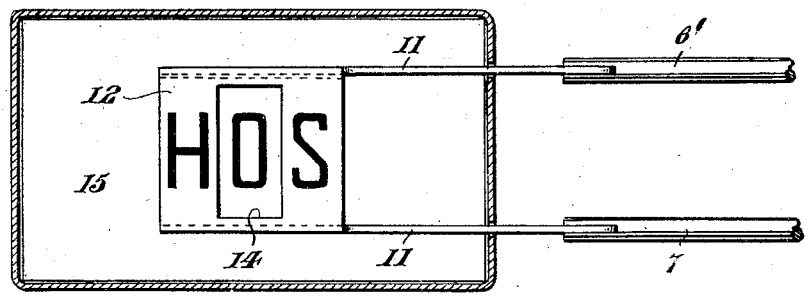
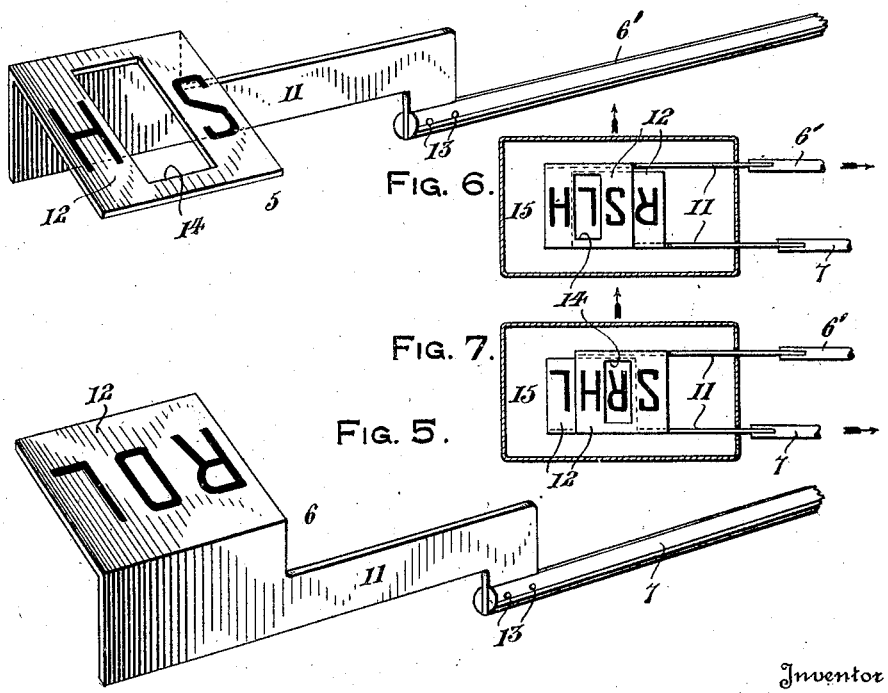

UNITED STATES PATENT OFFICE.

ANTHONY RAICH, OF KEMMERER, WYOMING.

GEAR-SHIFT INDICATOR.

1,427,415.

Specification of Letters Patent.  Patented Aug. 29, 1922.

Application filed December 1, 1921. Serial No. 519,238.

*To all whom it may concern:*

Be it known that I, ANTHONY RAICH, a citizen of the United States of America, residing at Kemmerer, in the county of Lincoln and State of Wyoming, have invented certain new and useful Improvements in Gear-Shift Indicators, of which the following is a specification.

This invention relates to certain new and useful improvements in gear shift indicators and has particular reference to the provision of visible indicating means operatively connected with the gear shifting rods of a motor vehicle change speed or transmission gearing whereby the driver may see at all times, the position of the gears for avoiding mistakes in driving, particularly useful to those learning to drive.

The primary object of the invention is to provide an indicator of the above kind of a simple and durable nature so that the same will meet with the requirements for a successful commercial use.

With the above general objects in view and others that will appear as the nature of the invention is better understood, the same consists of the novel form, combination and arrangement of parts hereinafter more fully described, shown in the accompanying drawings and claimed.

Figure 1:
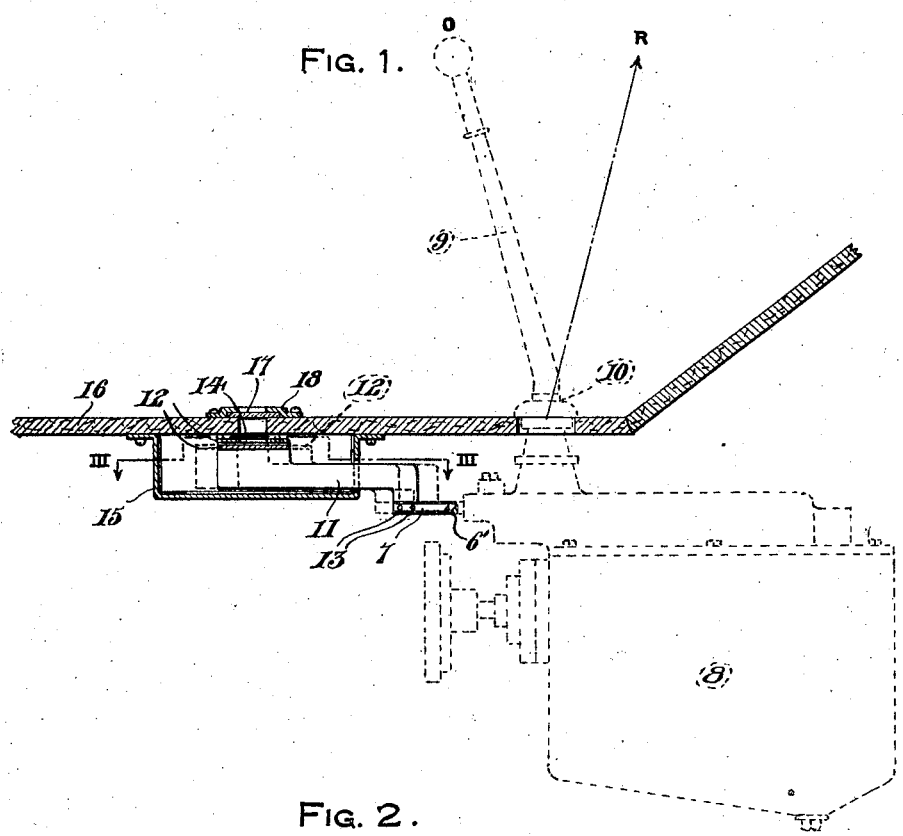
Figure 2:
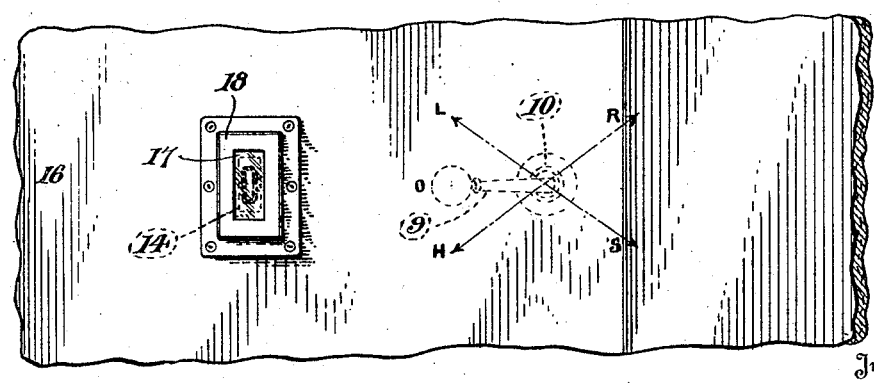

In the drawings, wherein like reference characters designate corresponding parts throughout the several views, Figure 1 is a substantially central longitudinal sectional view through the floor board of a motor vehicle equipped with an indicator constructed in accordance with the present invention and with the gear shift lever and transmission mechanism indicated by dotted lines, Figure 2 is a top plan view of the device shown in Fig. 1, Figure 3 is an enlarged horizontal sectional view taken upon line III—III of Fig. 1, Figure 4 is an enlarged perspective view of one of the indicator elements and a portion of the gear shift rod to which it is connected, Figure 5 is a view similar to Fig. 4 of the other indicator element and its rod, Figure 6 is a view similar to Fig. 3 on a smaller scale showing the position of the indicator elements when the gears are in "second speed", and Figure 7 is a view similar to Fig. 6 with the indicator elements positioned with the gears in "reverse."

Referring more in detail to the several views, the present invention in its preferred embodiment, includes a pair of indicator elements 5 and 6 each rigidly connected to the projecting end of one of the pair of gear shifting rods 6' and 7 provided in the usual motor vehicle transmission mechanism 8. The rods 6' and 7 are adapted for selective operation in the usual manner by means of a gear shift lever 9 which is usually mounted for universal movement as at 10 so as to be swung to either of the five positions represented in Fig. 2. In the standard gear shift, the forward left position of the lever effects connection of the "reverse" gear while the rearward left position effects connection of the "low speed" gear, and the forward right position of the lever effects connection of the "second" or intermediate speed gear while the rearward right position of said lever effects connection of the "high speed" gear, the lever being shown in its fifth or "neutral" position as shown in Fig. 2. When the lever 9 is in its "neutral" position the rods 6' and 7 project a similar distance rearwardly through the casing of the transmission gearing 8 as shown in Fig. 3.

In the preferred embodiment of the invention the indicator elements 5 and 6 are constructed from sheet metal so as to provide an arm 11 having a lateral indicator plate 12 integral with the rear end thereof and having its forward portion fastened in any suitable manner as at 13 to its gear shift rod, the plate portions 12 of the indicator elements 5 and 6 being arranged in overlapping relation. The plate portion 12 of the indicator element 5 is provided with a central opening 14 and has the letter "H" thereon at the rear side of said opening and the letter "S" at the forward side of said opening while the plate portion 12 of the indicator element 6 has the letter "R" thereon normally hidden by the portion of the indicator element 5 having the letter "S" thereon. The plate portion of the indicator element 6 also is provided with a central letter "O," or its equivalent, normally visible through the opening 14 of the plate of the indicator element 5 when the gears are in "neutral", and the plate portion 12 of the indicator element 6 is provided with the letter "L" rearwardly of the letter "O"

normally hidden by the plate portion of the indicator element 5 which has the letter "H" thereon and as shown in Figs. 1, 2 and 3.

The indicator elements are slidably mounted through one end of a housing 15 which is attached to the underside of the usual floor board 16 of a motor vehicle, and this floor board is provided with a slot having a transparent cover plate 17 retained in position by a frame 18, the slot or opening in the floor plate 16 being arranged so that the letter "O" will be seen therethrough when the lever is in "neutral" position and the indicator elements are normally disposed with the letter "O" registering with the opening 14.

As shown in the drawings, the plate portions 12 merely consist in lateral extensions of the arms 11 bent at right angles to the latter and in this way the construction of the indicator elements may be had with cheapness and durability.

In operation, with the parts positioned as shown in Figs. 1, 2 and 3, the lever and gears are in "neutral" position with the letter "O" registered with the opening 14 and with the transparent plate 17 so that the driver may see at a glance that such is the case. Upon moving the lever 9 forwardly and to the left the gear shift rod 7 will move rearwardly while the rod 6' will remain stationary so that the plates will be disposed as shown in Fig. 7 with the letter "R" exposed and thereby indicating that the gears are in "reverse." Similarly, if the lever is moved rearwardly and to the left the rod 7 will move forwardly so as to expose the letter "L" indicating that the gears are in "low speed" position and when the lever is moved forwardly and to the right the rod 6' is moved rearwardly while the rod 7 remains stationary, thus exposing the letter "S" indicating that the gears are in "second speed" position. In a like manner, when the lever is moved rearwardly and to the right the rod 6' moves forwardly so as to expose the letter "H," indicating that the gears are in "high speed" position.

Although the construction of transmission mechanism involving the rods 6' and 7 and lever 9 is of well known and commonly used form and although the same specifically forms no part of the present invention, it is noted by way of explanation that these rods 6' and 7 are operatively associated with the gearing and with the lever so that the same may be readily slid longitudinally and by reason thereof the various changing of the gears is had in the manner set forth.

From the foregoing description it is believed that the construction and operation of the present invention will be readily understood and appreciated by those skilled in the art.

What is claimed as new is:—

1. In combination with the horizontal sliding gear shifting bars of a motor vehicle change speed mechanism, means operatively connected to said rods for visibly indicating the position of the gears.

2. In combination with the horizontal sliding gear shifting bars of a motor vehicle change speed mechanism, means operatively connected to said rods for visibly indicating the position of the gears, said indicating means comprising a pair of indicator elements each rigidly connected to and movable with one of said rods.

3. In combination with the horizontal sliding gear shifting bars of a motor vehicle change speed mechanism, means operatively connected to said rods for visibly indicating the position of the gears, said indicating means comprising a pair of indicator elements each rigidly connected to and movable with one of said rods, said indicator elements including horizontal overlapping plates with indicia thereon.

4. In combination with the horizontal sliding gear shifting bars of a motor vehicle change speed mechanism, means operatively connected to said rods for visibly indicating the position of the gears, said indicating means comprising a pair of indicator elements each rigidly connected to and movable with one of said rods, said indicator elements including horizontal overlapping plates with indicia thereon, and the uppermost plate having an opening therethrough between its indicia through which the indicia of the lower plate is adapted to be exposed.

5. In combination with the horizontal sliding gear shifting bars of a motor vehicle change speed mechanism, means operatively connected to said rods for visibly indicating the position of the gears, said indicating means comprising indicator elements connected to and movable with said rods.

6. In combination with the gear shifting mechanism of a motor vehicle, means operatively connected thereto for visibly indicating the position of the gears, said means comprising indicator elements connected to and movable with said gear shifting means.

In testimony whereof I affix my signature.

ANTHONY RAICH.